United States Patent
Hubert-Choinard et al.

(10) Patent No.: US 12,297,791 B2
(45) Date of Patent: May 13, 2025

(54) ADDITIVE MANUFACTURING PROCESS OF A PART FOR AN AIRCRAFT PROPULSION UNIT NACELLE

(71) Applicants: Safran Nacelles, Gonfreville l'Orcher (FR); SAFRAN, Paris (FR)

(72) Inventors: Flavie Hubert-Choinard, Gonfreville l'Orcher (FR); Aurelie Soula, Gonfreville l'Orcher (FR); Jean-François Thouement, Gonfreville l'Orcher (FR); Sébastien Richard, Paris (FR)

(73) Assignees: Safran Nacelles, Gonfreville l'Orcher (FR); SAFRAN, Paris (FR)

( * ) Notice: Subject to any disclaimer, the term of this patent is extended or adjusted under 35 U.S.C. 154(b) by 887 days.

(21) Appl. No.: 16/552,188

(22) Filed: Aug. 27, 2019

(65) Prior Publication Data
US 2020/0062423 A1 Feb. 27, 2020

(30) Foreign Application Priority Data
Aug. 27, 2018 (FR) .................................. 18/57691

(51) Int. Cl.
 *B29C 64/165* (2017.01)
 *B22F 1/10* (2022.01)
 (Continued)

(52) U.S. Cl.
 CPC ............. *F02K 1/827* (2013.01); *B22F 1/10* (2022.01); *B22F 10/14* (2021.01); *B22F 10/43* (2021.01);
 (Continued)

(58) Field of Classification Search
 CPC ....... B29C 64/165; B33Y 10/00; B33Y 70/00; B33Y 80/00; B64F 5/10; B64D 29/00; B22F 10/00; B22F 10/10; B22F 1/10; B22F 3/10; B22F 3/11; B22F 3/1115; B22F 5/009; B22F 5/10; B22F 2003/1042; B22F 2301/40; B22F 2998/10; B29K 2505/00; B29L 2031/3076
 See application file for complete search history.

(56) References Cited

U.S. PATENT DOCUMENTS

2009/0263627 A1* 10/2009 Hand ...................... F02K 1/822
  427/372.2
2011/0282452 A1* 11/2011 Koerner ............... G10K 11/162
  428/105

(Continued)

FOREIGN PATENT DOCUMENTS

| EP | 3351320 | 7/2018 |
|----|---------|--------|
| EP | 3530763 | 8/2019 |
| WO | 2019191450 | 10/2019 |

OTHER PUBLICATIONS

WO2016185115 English Translation (Year: 2016).*
WO2017017369 English Translation (Year: 2017).*

*Primary Examiner* — Galen H Hauth
*Assistant Examiner* — Baileigh Kate Darnell
(74) *Attorney, Agent, or Firm* — Burris Law, PLLC

(57) ABSTRACT

A method for additively manufacturing a part of a nacelle of an aircraft propulsion unit such as an exhaust conduit portion a step of depositing a compound including a TiAl-based powdery intermetallic alloy and consolidating the compound by sintering, without melting the compound.

15 Claims, 4 Drawing Sheets

(51) Int. Cl.
*B22F 5/00* (2006.01)
*B22F 10/00* (2021.01)
*B22F 10/14* (2021.01)
*B22F 10/43* (2021.01)
*B33Y 10/00* (2015.01)
*B33Y 70/00* (2020.01)
*B33Y 80/00* (2015.01)
*B64D 29/00* (2006.01)
*B64F 5/10* (2017.01)
*F02K 1/82* (2006.01)
*B22F 10/16* (2021.01)
*B22F 10/47* (2021.01)
*B22F 10/64* (2021.01)
*B29K 505/00* (2006.01)
*B29L 31/30* (2006.01)

(52) U.S. Cl.
CPC ............ *B29C 64/165* (2017.08); *B33Y 10/00* (2014.12); *B33Y 70/00* (2014.12); *B33Y 80/00* (2014.12); *B64D 29/00* (2013.01); *B64F 5/10* (2017.01); *B22F 10/16* (2021.01); *B22F 10/47* (2021.01); *B22F 10/64* (2021.01); *B22F 2301/40* (2013.01); *B29K 2505/00* (2013.01); *B29L 2031/3076* (2013.01)

(56) References Cited

U.S. PATENT DOCUMENTS

| | | | |
|---|---|---|---|
| 2014/0037983 A1* | 2/2014 | Godfrey | C22C 1/0491 |
| | | | 204/192.15 |
| 2016/0138423 A1* | 5/2016 | Ottow | F01D 25/24 |
| | | | 29/527.1 |
| 2016/0237836 A1* | 8/2016 | Harris | F01D 25/12 |
| 2017/0107909 A1* | 4/2017 | Loewenstein | F02K 1/827 |
| 2017/0291214 A1 | 10/2017 | Roberge | |
| 2017/0306447 A1 | 10/2017 | Lin et al. | |
| 2018/0112293 A1 | 4/2018 | Knittel et al. | |
| 2019/0270254 A1* | 9/2019 | Mark | B29C 64/118 |

* cited by examiner

ADDITIVE MANUFACTURING PROCESS OF A PART FOR AN AIRCRAFT PROPULSION UNIT NACELLE

CROSS-REFERENCE TO RELATED APPLICATIONS

This application claims priority to and the benefit of FR 18/57691 filed on Aug. 27, 2018. The disclosures of the above applications are incorporated herein by reference.

FIELD

The present disclosure relates to the field of manufacturing parts for an aircraft propulsion unit nacelle, particularly complex geometry parts such as exhaust conduit panels.

BACKGROUND

The statements in this section merely provide background information related to the present disclosure and may not constitute prior art.

In the state of the prior art, there are known methods for manufacturing parts for an aircraft propulsion unit nacelle by making composite or metal sheets and assembling these sheets with other elements such as flanges or stiffeners or else cellular structures—see for example US 2006/0039817 A1. Such sheets have a low ductility so that a complex geometry part can be obtained only by implementing long and expensive manufacturing steps.

In addition, parts such as a primary nozzle or a gas ejection plug of an exhaust conduit are subjected to an extreme thermal environment leading to the use of materials such as titanium Beta 21s or Inconel 625 or 718. However, such materials are expensive and heavy.

SUMMARY

A method for manufacturing parts such as a primary nozzle or an ejection plug of an exhaust conduit of a nacelle of an aircraft propulsion unit is provided. The method allows simplifying and reducing the manufacturing costs while reducing the mass of the parts thus manufactured.

A method for manufacturing such a part includes depositing a compound comprising a TiAl-based powdery intermetallic alloy and further includes consolidating the compound by sintering.

TiAl is a material having good performances at high temperature and having a relatively low density.

In spite of the reduced ductility of TiAl, the deposition of a compound comprising this material and the consolidation thereof by sintering allow simple and inexpensive manufacturing of a complex geometry part such as an exhaust conduit portion of a nacelle of an aircraft propulsion unit, while conferring a reduced mass and good performances at high temperature to this part.

According to a first variant, the method may comprise a step of depositing a compound comprising the TiAl-based powdery intermetallic alloy.

According to a second variant, the compound may comprise a polymer.

In each of these variants, the polymer has a binder function that allows agglomerating the compound according to the shape that it is desired to obtain.

In order to remove the polymeric binder, the method preferably comprises a debinding step. The debinding can be of the thermal or aqueous type. The debinding step can be carried out before the step of consolidation by sintering, or simultaneously.

According to the present disclosure, in one variation the method does not implement any step of melting the compound. In other words, the consolidation of the compound can therefore preferably be obtained only by heating this compound below its melting temperature.

The absence of melting of the powder particles allows avoiding or limiting the problems of TiAl hot cracking.

More generally, the mechanical properties of the part are thus improved.

In one form of the present disclosure, the method can be implemented such that the part forms a panel comprising a cellular structure constituting cavities. For example, these cavities may be Helmholtz cavities.

In a particular example of the present disclosure, the panel manufactured by this method may comprise two skins sandwiching the cellular structure.

More specifically, the panel can comprise a first skin and a second skin sandwiching the cellular structure, and the first skin and the cellular structure can be manufactured by implementing said compound deposition step. The second skin can either be manufactured by implementing said compound deposition step, or be pre-manufactured and affixed against the cellular structure.

In one form of the present disclosure, the method may comprise a step of disposing one or more support(s) in respective cavities of the cellular structure so as to support the second skin during the manufacture or during the affixation thereof on the cellular structure.

Such supports allow supporting the second skin, by constituting for example supports for depositing the compound or, when the second skin is pre-manufactured, by avoiding or limiting the creeping of the second skin at the cavities when assembling this second skin.

In order to remove the supports from the cavities, these supports can preferably be made of a fugitive material, for example a thermoplastic material. The supports can thus be removed by heating and evacuated from the cavities by any conventional process or technique known to those skilled in the art, for example via perforations made in one of the skins, or via channels provided to this end.

In one form of the present disclosure, the supports can be made by additive manufacture simultaneously with the manufacture of the first skin and/or the cellular structure.

In some variations a deposition element is used for deposing the compound and another deposition element is used for deposing the material in which the supports are made, these different deposition elements preferably being arranged for working in parallel.

Advantageously, the supports can be auxetic such that, under the effect of an increase in temperature, their dimension between the first and the second skin remains less than a predetermined value.

More specifically, in some variations of the present disclosure said predetermined value is selected such that, under the effect of an increase in temperature, the dimension of the supports between the first and the second skin remains the same or has a low or negligible increase with respect to the forces exerted by these supports against the skins under the effect of the expansion of these supports.

It is thus possible to avoid or limit any deformation of the skins under the effect of the thermal expansion of the supports.

In one form of the present disclosure, the supports may have a hexagonal re-entrant shape. Besides the auxetic property conferred by such a shape, the latter also allows reducing the amount of material constituting these supports, and thus limiting the amount of material to be evacuated during the removal of the supports.

The method of the present disclosure may comprise a step of vertically disposing the panel so as to avoid the creeping of the skins, particularly at the cavities of the cellular structure. The consolidation step, and optionally the debinding step, can be carried out on the panel thus disposed.

In order to avoid or limit the creeping of the walls of the cellular structure which delimit the cavities, walls of the cellular structure can be manufactured convex such that, when sintering the vertically disposed panel, these convex walls take a substantially planar shape under the effect of gravity.

Of course, many other solutions can allow avoiding or limiting the creeping of the walls of the cellular structure. For non-limiting examples, the walls of the cavities may be corrugated and/or the panel may be disposed vertically so as to orient the cavities in order to enhance the orientation of the walls of the cavities relatively horizontally. Such solutions can be combined together and/or with the manufacture of a cellular structure with convex-shaped walls.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

Other characteristics and advantages of the present disclosure will appear upon reading the following non-limiting description and the appended figures, in which.

Identical or similar elements are identified by identical reference signs in all the figures.

Figure 1:
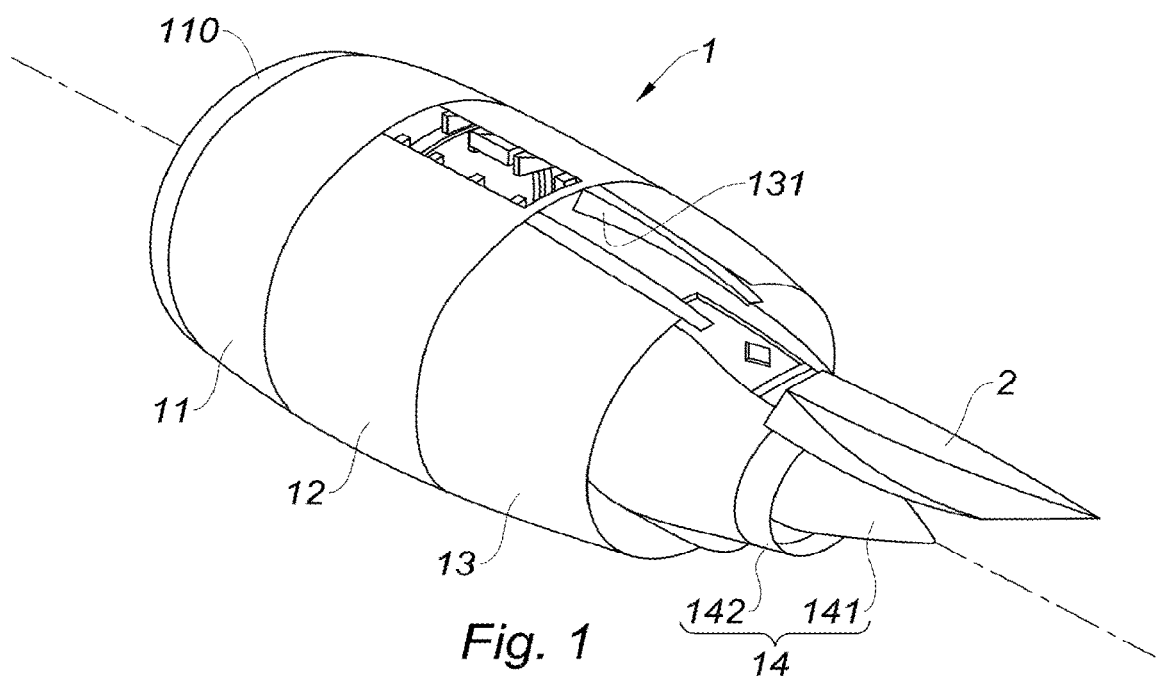
FIG. 1 is a schematic perspective view of a nacelle of an aircraft propulsion unit according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a method for manufacturing a part of a nacelle of an aircraft propulsion unit such as an exhaust conduit portion.

An example of an aircraft (not shown) turbojet engine (not shown) nacelle 1 is illustrated in FIG. 1. This nacelle 1 comprises a pylon 2 intended to be fastened to a wing (not shown) of the aircraft. The nacelle 1 comprises an upstream section 11 provided with a lip 110 forming an air inlet. This upstream section 11 is adapted to allow enhanced collection toward the turbojet engine of the air desired to the supply of a fan (not shown) and of internal compressors (not shown) of the turbojet engine. The nacelle 1 also includes a median section 12 receiving the fan as well as a downstream section 13. Under the pylon 10 and downstream of the turbojet engine, the nacelle 1 comprises an exhaust conduit 14 including a gas ejection plug 141 and a primary nozzle 142. The ejection plug 141 and the primary nozzle 142 of the exhaust conduit 14 define a passage for a hot air flow leaving the turbojet engine.

The nacelle 1 and in particular the exhaust conduit 14 may comprise parts manufactured by a method in accordance with the teachings of the present disclosure, whose implementation examples are described below.

In a general manner, the parts thus manufactured can constitute sub-elements of the nacelle 1 such as walls and/or self-supporting panels and/or with or without an acoustic treatment function and/or a structural function.

In particular, the method can be implemented for manufacturing a panel including a cellular structure and skins sandwiching the cellular structure. Such a cellular structure may comprise cavities that may constitute, in some forms, Helmholtz resonators.

Such panels or more generally such parts may constitute all or part of a sub-element of the nacelle 1, for example all or part of the ejection plug 141, or of the primary nozzle 142, or else of an inner fixed structure 131 of the nacelle 1. These examples are in no way limiting and the present disclosure can particularly be implemented for manufacturing any nacelle 1 part having a complex geometry and subjected to significant thermal constraints such as the parts in direct or indirect contact with the hot air flow leaving the turbojet engine.

The method according to the present disclosure is characterized by the implementation of additive manufacturing steps, being understood that an additively manufactured part, according to the teachings of the present disclosure, may be assembled with another part manufactured according to any method, for example a subtractive method.

In one form, the method of the present disclosure comprises a step of depositing a compound comprising a TiAl-based powdery intermetallic alloy.

This compound can take the form of granules or wires.

In some variations of the present disclosure, the method does not comprise any step of melting the compound.

According to the teachings of the present disclosure, the compound is consolidated by sintering.

In case of using a polymeric binder, the polymer may either be deposited on the TiAl-based powdery intermetallic alloy, or be directly integrated into the compound before depositing the compound comprising the polymer.

If desired, the removal of the polymer may be carried out during a specific debinding step.

The effective implementation of these various steps falls within the competence of those skilled in the art, specialized in the manufacture of nacelles by additive manufacture method. The present disclosure is more specifically characterized by the combination, on the one hand, of the deposition of a compound followed by consolidation by sintering—without melting—and, on the other hand, the use of TiAl as a constituent of the compound. This combination indeed allows simply and inexpensively manufacturing a part having a complex geometry, a reduced mass and having good performances at high temperature.

Figure 2:
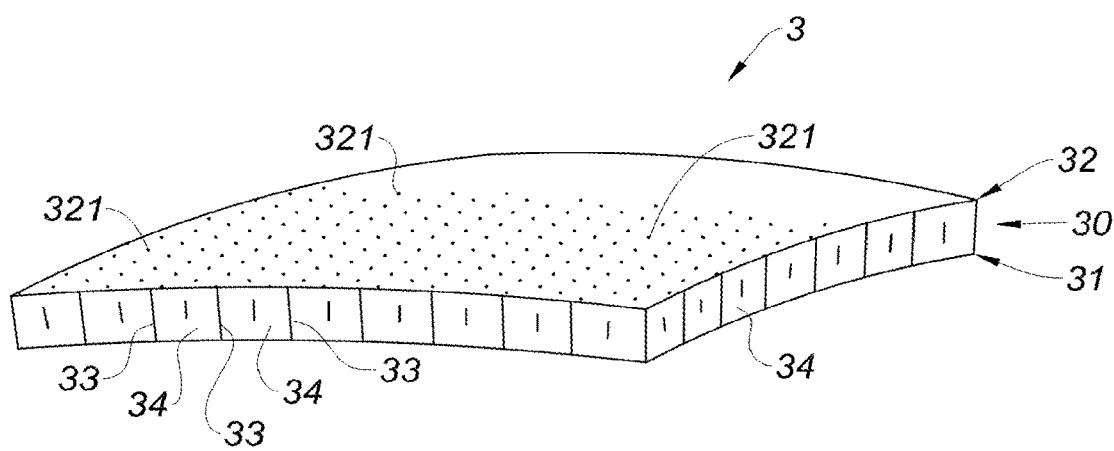
FIG. 2 is a schematic perspective view of an acoustic panel of an aircraft propulsion unit nacelle according to the teachings of the present disclosure.

With reference to FIG. 2, such a method can be implemented for manufacturing a panel 3.

In this example, the panel 3 comprises a cellular structure 30 sandwiched between two skins 31 and 32.

The cellular structure 30 constitutes cavities 34 of the Helmholtz type delimited by transverse walls 33.

The skin 32 is here an acoustic skin comprising perforations 321 communicating the cells 34 with an external volume of the panel 3.

The additive manufacturing method of the present disclosure can be implemented for manufacturing all or part of such a panel 3.

For example, both the skins 31 and 32 and the cellular structure 30 can be manufactured additively, with the method of the present disclosure. Alternatively, only the cellular structure 30 and one of the skins, for example the skin 31 can be manufactured with the method of the present disclosure, and the other skin 32 previously manufactured according to any method is then affixed on the cellular structure 30. Thus, in the latter case, the skin 32 may be manufactured according to an additive method or according to a subtractive method—in the latter case, the perforations 321 may for example be obtained by drilling a solid sheet before or after affixing this sheet on the cellular structure 30.

Figure 3:
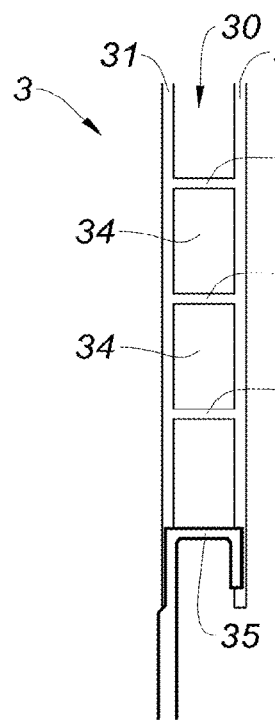
FIG. 3 is a schematic view of an acoustic panel of an aircraft propulsion unit nacelle in a vertical position according to the teachings of the present disclosure.

In one form of the present disclosure illustrated in FIG. 3, the panel 3 can be disposed vertically in order to carry out the step of consolidation by sintering, so as to avoid the creeping of the skins 31/32 at the cavities 34 of the cellular structure 30, that is to say outside the areas where the skins are supported by the walls 33.

In order to avoid the creeping of the walls 33 of the cavities during sintering with the panel disposed vertically, the cellular structure 30 can be manufactured with convex walls 33 such that, when sintering the vertically disposed panel, these convex walls take a substantially planar shape under the effect of gravity.

Figure 4:
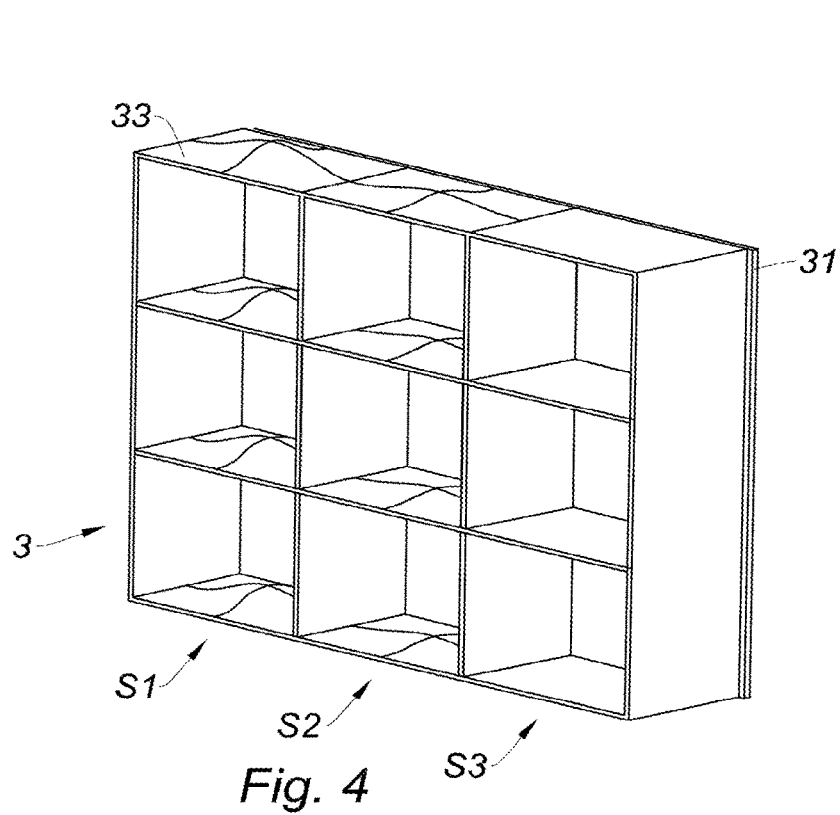
FIG. 4 is a schematic perspective view of an acoustic panel of an aircraft propulsion unit nacelle in a vertical position, with convex cellular structure walls according to the teachings of the present disclosure.
Figure 5:
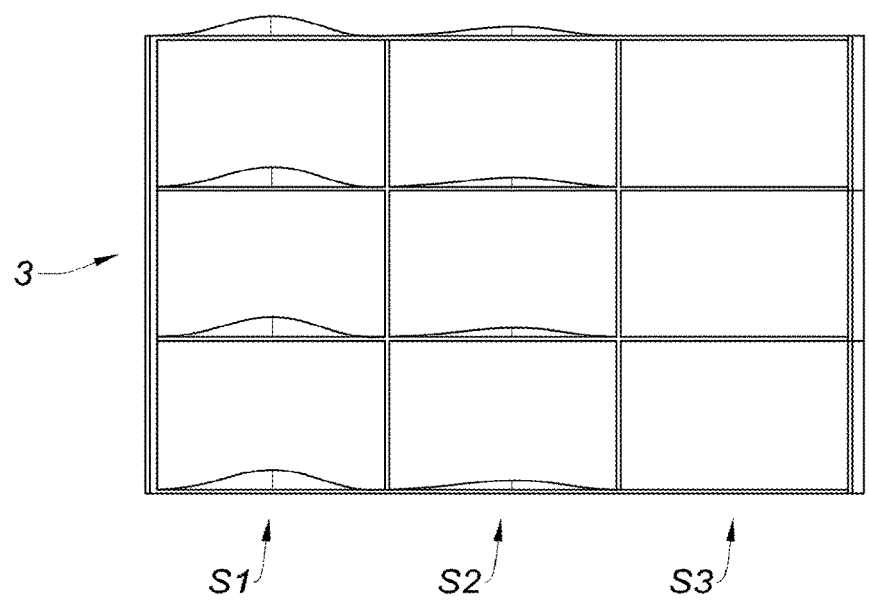
FIG. 5 is a schematic front view of the panel of FIG. 4.

FIGS. 4 and 5 show a panel 3 with a skin 31 and a cellular structure comprising a set of horizontal and vertical walls 33 delimiting cavities, the panel 3 being shown in said vertical position. In this example, the horizontal walls are likely to creep during sintering. For purely illustrative reasons, these figures show two series S1 and S2 of convex horizontal walls and one series S3 of planar horizontal walls.

Figure 8:
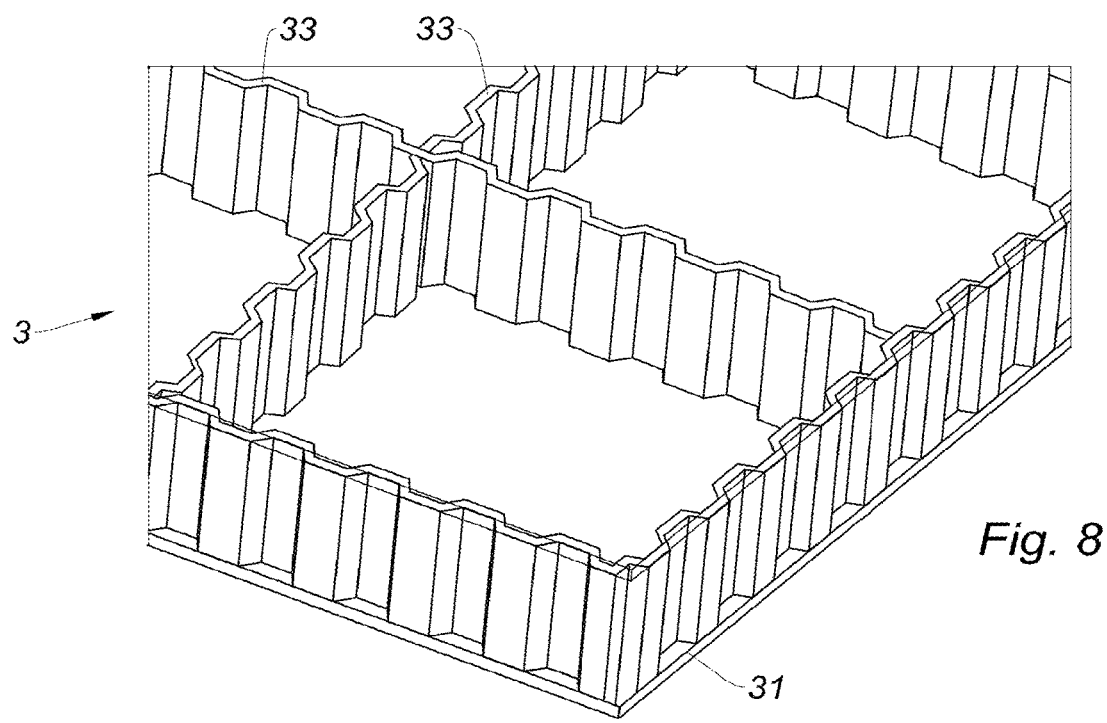
FIG. 8 is a schematic partial perspective view of an acoustic panel of an aircraft propulsion unit nacelle, with corrugated cellular structure walls according to the teachings of the present disclosure.

FIG. 8 shows a panel 3 with a skin 31 and a cellular structure comprising corrugated walls 33. The corrugation of the walls 33 also allows limiting their creeping during sintering. In a form of the present disclosure not shown, it is possible to produce walls 33 that are both convex and/or corrugated.

Depending on the dimensions and the mechanical and thermal constraints to which the panel 3 is subjected during sintering, the dimensions and the shape of the convex walls can be adapted (compare for example the series S1 with the series S2) such that, after sintering, these walls take a substantially planar shape.

According to one aspect of the present disclosure, the method may further comprise a step of disposing the supports 4 in respective cavities of the cellular structure 30.

Figure 6:
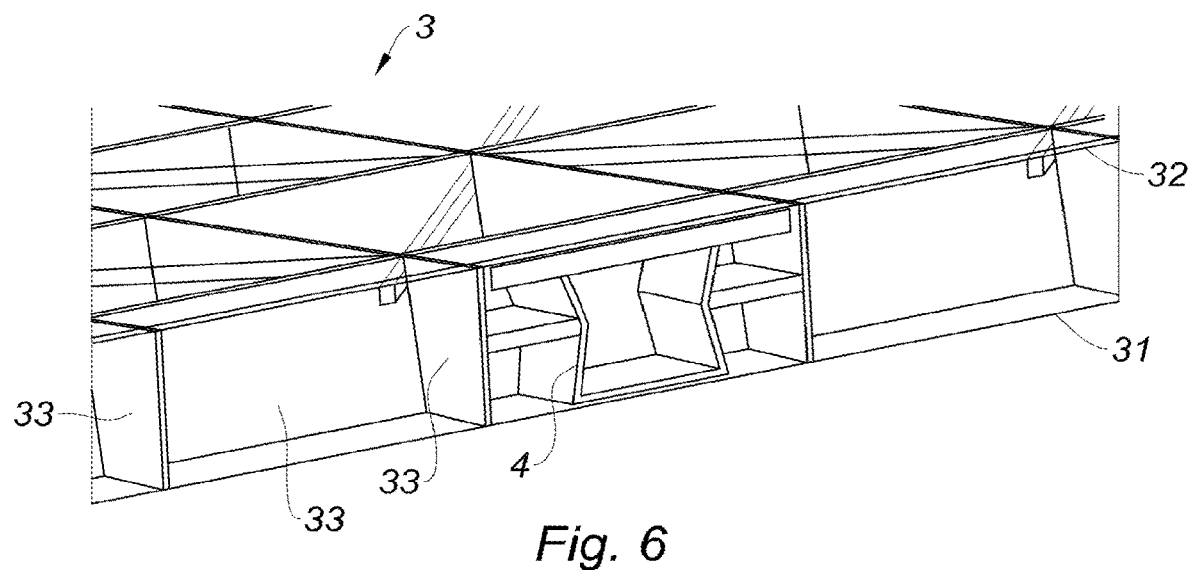
FIG. 6 is a schematic partial perspective view of an acoustic panel of an aircraft propulsion unit nacelle, the panel comprising an auxetic support housed in a cavity according to the teachings of the present disclosure.
Figure 7:
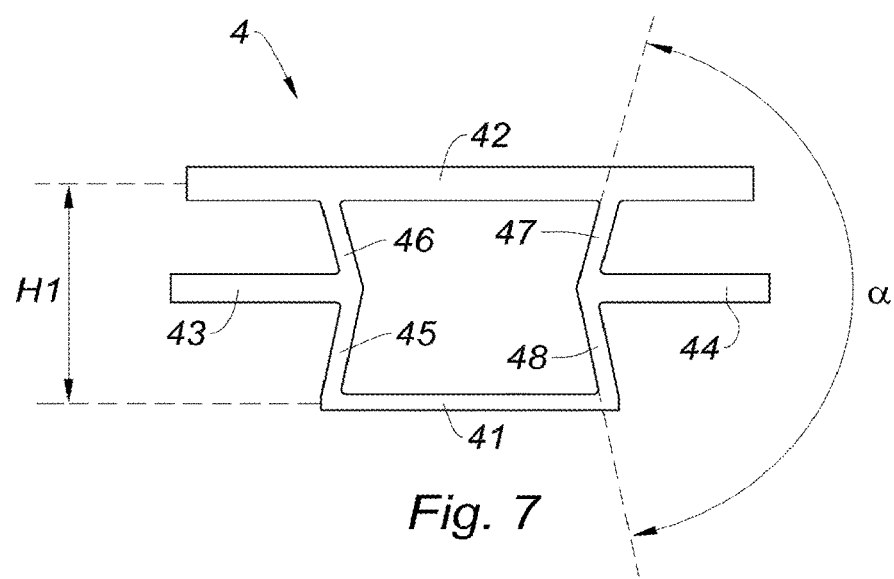
FIG. 7 is a schematic view of the auxetic support illustrated in FIG. 6.

An example of a support 4 is shown in FIG. 7, and the disposition of such a support 4 in a cavity is illustrated in FIG. 6.

Such a disposition of the supports 4 within the cellular structure allows, for example, supporting the pre-manufactured skin 32 when it is affixed on the cellular structure 30, or else supporting the compound when the skin 32 is manufactured according to the method of the present disclosure.

In order to be able to remove the supports 4 which are enclosed in the cellular structure after assembling or manufacturing the skin 32, these supports 4 may be made of a fugitive material, for example a thermoplastic material.

Their removal during sintering can be performed according to any known technique, for example by evacuation through perforations 321 made in the skin 32 (see FIG. 2) or else via specific channels (not shown).

Such supports 4 can either be introduced into the cavities before manufacturing or assembling the skin 32 or be made by additive manufacture simultaneously with the manufacture of the skin 31 and/or the cellular structure 30.

The support 4 illustrated in FIGS. 6 and 7 is auxetic such that, under the effect of an increase in temperature, its dimension H1 between the two skins 31 and 32 changes less than a predetermined value which is selected in practice so as to prevent the expansion of the support 4 from exerting a force on the skins 31 and 32 which may deform them.

In the particular case of the support 4 of FIG. 7, the support 4 has a hexagonal re-entrant shape. This support 4 comprises a lower portion 41 intended to come into contact with one of the skins (skin 31), an upper portion 42 intended to come into contact with the other skin (skin 32), arms 43 and 44 having ends intended to come into contact with respective walls 33, and connection portions 46-48 connecting the arms 43 and 44 to the lower 41 and upper 42 portions.

The connection portions 46-48 form with the lower 41 and upper 42 portions said hexagonal re-entrant shape (see FIG. 7).

Such a support 4 is dimensioned such that the expansion of the arms 43 and 44 close the angle α formed on the one hand, by the connection portions 45 and 46 and on the other hand by the connection portions 47 and 48.

It is therefore understood that the expansion of the support 4 thus allows maintaining the dimension H1, which represents the dimension of the support 4 between the two skins, substantially constant.

Figure 10:
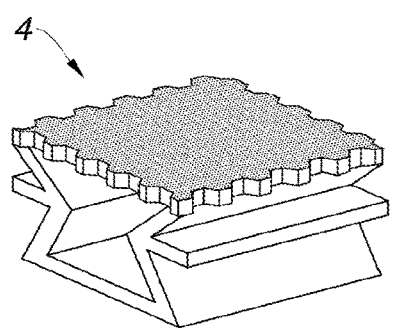
FIG. 10 is a schematic view of the auxetic support illustrated in FIG. 9.
Figure 9:
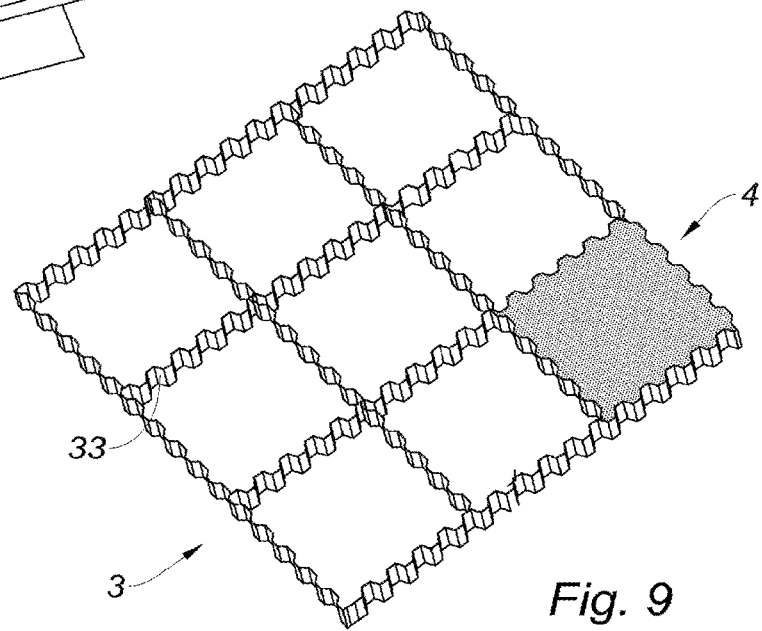
FIG. 9 is a schematic perspective view of the panel of FIG. 8, the panel comprising an auxetic support housed in a cavity according to the teachings of the present disclosure.

FIG. 9 shows a panel 3 similar to that of FIG. 8 with corrugated walls 33. In this case, it is preferable to use a support 4 as illustrated in FIG. 10, comprising a corrugated periphery, and dimensioned to match the corrugated contours of a cavity (see FIG. 9).

Of course, the present disclosure is not limited to the examples which have just been described and many arrangements may be made to these examples without departing from the scope of the present disclosure. For example:

The method of the present disclosure can be implemented for manufacturing a part constituting a nacelle element such as for example an ejection plug of an exhaust conduit, or for manufacturing a part constituting a segment of such an element, in this case the element can be obtained by assembling several segments thus manufactured;

When the manufactured part is a panel 3, the method of the present disclosure can also be implemented for manufacturing other elements of this panel such as for example a flange 35 for laterally closing the cellular structure 30 and/or for fastening the panel 3 (see FIG. 3);

A part manufactured in accordance with the present disclosure may be assembled with any other part manufactured according to any technique, by any process or technique, in particular by welding, brazing or co-sintering; and The shape of the perforations 321 made in the acoustic skin 32 may be adapted for optimizing the opening percentage and/or for optimizing the strength of this skin 32 during sintering: for example, these perforations may have a square shape and the square shape can be oriented so as to direct a corner of the square downward when the panel is disposed vertically.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A method for manufacturing a part of a nacelle of an aircraft propulsion unit, the method comprising:
 a step of depositing, by an additive manufacturing process, a compound comprising a TiAl-based powdery intermetallic alloy to form the part having a predetermined shape such that the TiAl-based powdery intermetallic alloy is contained in the part when the part having the predetermined shape is formed; and
 a step of consolidating the compound by sintering after the part having the predetermined shape is formed,
 wherein the method is implemented such that the part forms a panel comprising a cellular structure constituting cavities, the method further comprising a step of disposing one or more supports in respective cavities of the cellular structure so as to support a second skin during the manufacture or during the affixation of the second skin, the supports being made of a fugitive material, wherein the supports are auxetic such that under the effect of an increase in temperature, a change in a dimension of the supports between a first skin and the second skin remains less than a predetermined value.

2. The method according to claim 1 further comprising a step of depositing a polymer on the TiAl-based powdery intermetallic alloy.

3. The method according to claim 2, further comprising a debinding step in which the polymer is removed.

4. The method according to claim 1, wherein the compound comprises a polymer.

5. The method according to claim 4, further comprising a debinding step in which the polymer is removed.

6. The method according to claim 1, wherein the method does not include a step of melting the compound.

7. The method according to claim 1, wherein the panel comprises the first skin and the second skin sandwiching the cellular structure, the first skin and the cellular structure being manufactured by implementing said compound deposition step, and the second skin being manufactured by implementing said compound deposition step or by pre-manufacturing and affixing the second skin against the cellular structure.

8. The method according to claim 7 further comprising a step of vertically disposing the panel so as to avoid the creeping of the skins, the consolidation step being carried out on the panel vertically disposed.

9. The method according to claim 8, wherein the cellular structure comprises walls delimiting the cavities, the walls being manufactured convex such that the convex walls take a substantially planar shape under the effect of gravity during sintering of the vertically disposed panel.

10. The method according to claim 1, wherein the supports are made by additive manufacture simultaneously with the manufacture of the first skin and/or the cellular structure.

11. The method according to claim 1, wherein the part of the nacelle is an exhaust conduit portion.

12. The method according to claim 1, wherein the part is not attached to any component during the additive manufacturing process to form a monolithic body.

13. The method according to claim 1, wherein the part is formed to have at least one convex surface during the additive manufacturing process, wherein the at least one convex surface becomes a planar surface during the step of consolidating the compound.

14. The method according to claim 1, wherein the part includes a cellular structure defining cavities, the method further comprising disposing one or more supports in one or more of the cavities before the step of consolidating the compound, wherein the step of consolidating the compound is performed when the one or more supports are disposed in the one or more of the cavities, the method further comprising removing the one or more supports after the step of consolidating the compound.

15. A method for manufacturing a part of a nacelle of an aircraft propulsion unit, the method comprising:
 a step of depositing, by an additive manufacturing process, a compound comprising a TiAl-based powdery intermetallic alloy to form the part having a predetermined shape such that the TiAl-based powdery intermetallic alloy is contained in the part when the part having the predetermined shape is formed; and
 a step of consolidating the compound by sintering after the part having the predetermined shape is formed,
 wherein the method is implemented such that the part forms a panel comprising a cellular structure constituting cavities,
 the method further comprising a step of disposing one or more supports in respective cavities of the cellular structure so as to support a second skin of the panel during the manufacture or during the affixation of the second skin, the supports being made of a fugitive material so as to remove the supports during sintering, wherein the supports are configured to have a shape that provides an auxetic property for the supports in order to reduce a force applied to the second skin by the supports under the effect of an increase in temperature during the manufacture or the affixation of the second skin.

* * * * *